(12) United States Patent
Brady et al.

(10) Patent No.: US 10,644,519 B2
(45) Date of Patent: May 5, 2020

(54) POSITIONALLY COMPLIANT CHARGE CONNECTOR FOR ROBOTIC DRIVE UNIT CHARGING

(71) Applicant: Amazon Technologies, Inc., Seattle, WA (US)

(72) Inventors: Matthew Anthony Brady, Boston, MA (US); Dragan Pajevic, Arlington, MA (US); Jennifer Pagani, Wilmington, MA (US); Jude Royston Jonas, Hudson, NH (US); Craig Ropi, Medford, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/992,776

(22) Filed: May 30, 2018

(65) Prior Publication Data

US 2019/0372364 A1  Dec. 5, 2019

(51) Int. Cl.
*H02J 7/00* (2006.01)
*G05D 1/02* (2006.01)

(52) U.S. Cl.
CPC .......... *H02J 7/0027* (2013.01); *G05D 1/0225* (2013.01); *H02J 7/0044* (2013.01); *H02J 7/0045* (2013.01)

(58) Field of Classification Search
None
See application file for complete search history.

(56) References Cited

U.S. PATENT DOCUMENTS

| 8,636,527 | B2 | 1/2014 | Hengel et al. |
| 9,533,587 | B2 | 1/2017 | Krammer |
| 9,559,461 | B1 | 1/2017 | Diehr |
| 2008/0042620 | A1* | 2/2008 | Udono .......... H02J 7/0045 320/137 |
| 2010/0286823 | A1* | 11/2010 | Neki .......... B25J 19/005 700/245 |
| 2014/0184144 | A1* | 7/2014 | Henricksen .......... B25J 9/0003 320/107 |

FOREIGN PATENT DOCUMENTS

| DE | 202017004629 U1 | 10/2017 |
| EP | 2960100 A2 | 12/2015 |

OTHER PUBLICATIONS

International Patent Application No. PCT/US2019/034189; Int'l Written Opinion and Search Report; dated Oct. 18, 2019; 12 pages.

* cited by examiner

*Primary Examiner* — David V Henze-Gongola
(74) *Attorney, Agent, or Firm* — BakerHostetler

(57) ABSTRACT

An electric charging station for a mobile drive unit includes a frame that defines an interior volume of space. The frame is configured to carry an electrical charging unit positioned above the interior volume of space. The station includes a station charge connector that is configured to be in electrical communication with the electrical charging unit and is also configured for mating with a corresponding charge connector of the mobile drive unit. The station charge connector extends forward within the interior volume of space along a longitudinal direction that is substantially perpendicular to the vertical direction. The station charge connector is connected to the frame by at least one compliant mechanism that is configured to provide the station charge connector with positional compliance with respect to the frame.

18 Claims, 10 Drawing Sheets

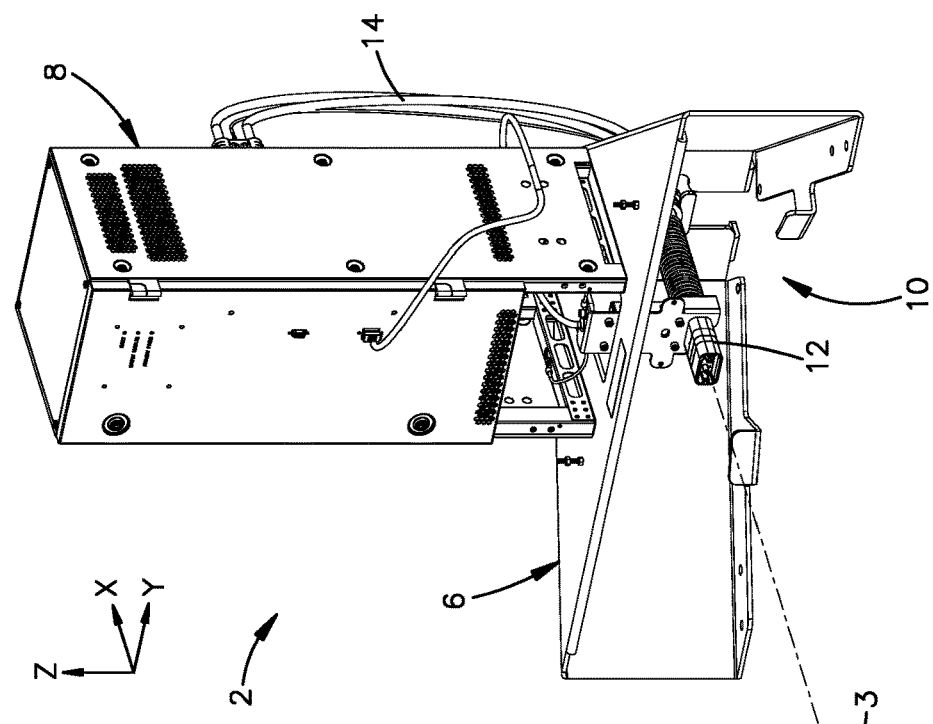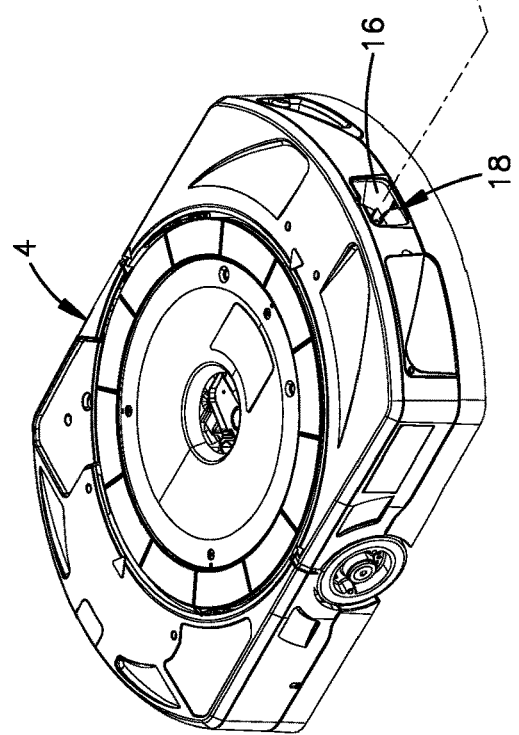
Fig.1

US 10,644,519 B2

1

POSITIONALLY COMPLIANT CHARGE CONNECTOR FOR ROBOTIC DRIVE UNIT CHARGING

BACKGROUND

The present disclosure pertains to charging devices and systems, and more particularly to charging devices and systems for providing electrical charge to one or more robotic mobile drive units.

Modern warehouses move products on a vast scale. In some cases, such as in certain types of order fulfillment centers or sortation centers, products are housed in pods, which are four sided shelving units on metal frame and legs. The pods are moved about fulfillment centers by mobile drive units. Mobile drive units are robotic devices that may, for example, navigate autonomously or at least semi-autonomously along a warehouse floor. The mobile drive units can have center drive wheels, front and rear casters, a lift unit (for lifting and lowering the pod before and after movement), and a navigation system (including one or more of an upwardly facing camera and a downwardly facing camera), all of which can be enclosed within a housing. The top of the housing includes a circular opening that a lift, such as a turntable, extends through. The turntable also is connected to a turntable motor such that when the pod is on the turntable, the turntable turns the pod to orient the face of the pod as desired. The mobile drive units of a warehouse are typically electrically powered by batteries, which require either periodic recharging and/or interchanging.

BRIEF DESCRIPTION OF THE DRAWINGS

The following detailed description will be better understood when read in conjunction with the appended drawings, in which there is shown in the drawings example embodiments for the purposes of illustration. It should be understood, however, that the present disclosure is not limited to the precise arrangements and instrumentalities shown. In the drawings:

FIG. 1 shows a perspective view of a mobile drive unit and a charging station configured to charge the mobile drive unit, according to an embodiment of the present disclosure;

2

Figure 12:
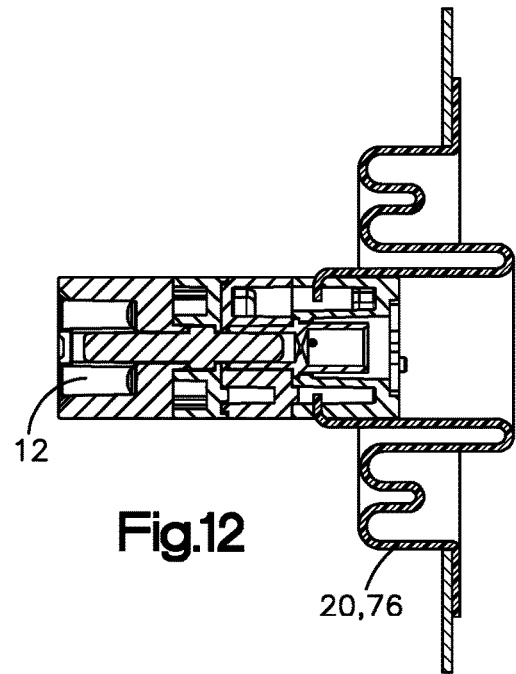
Figure 13:
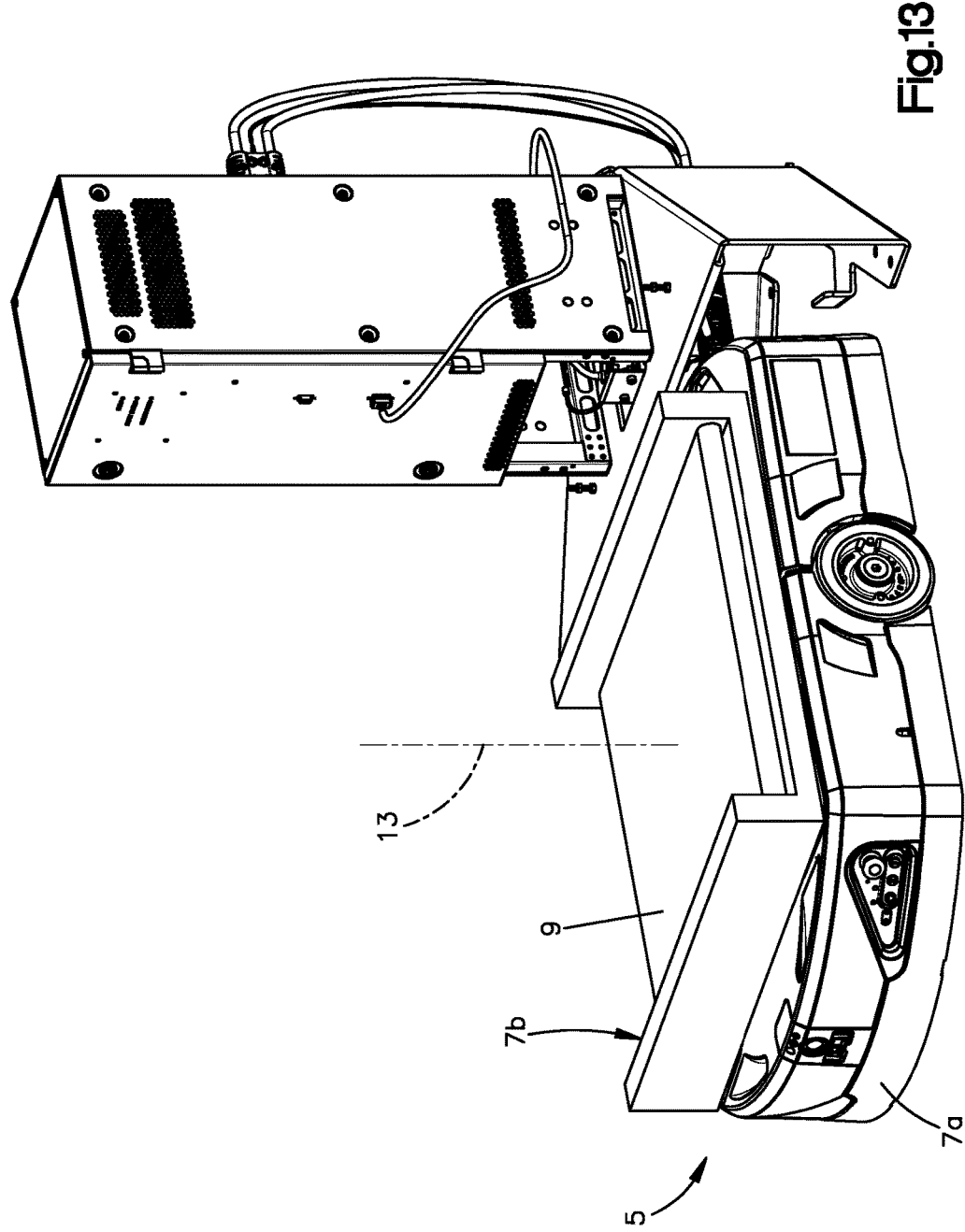
Figure 14:
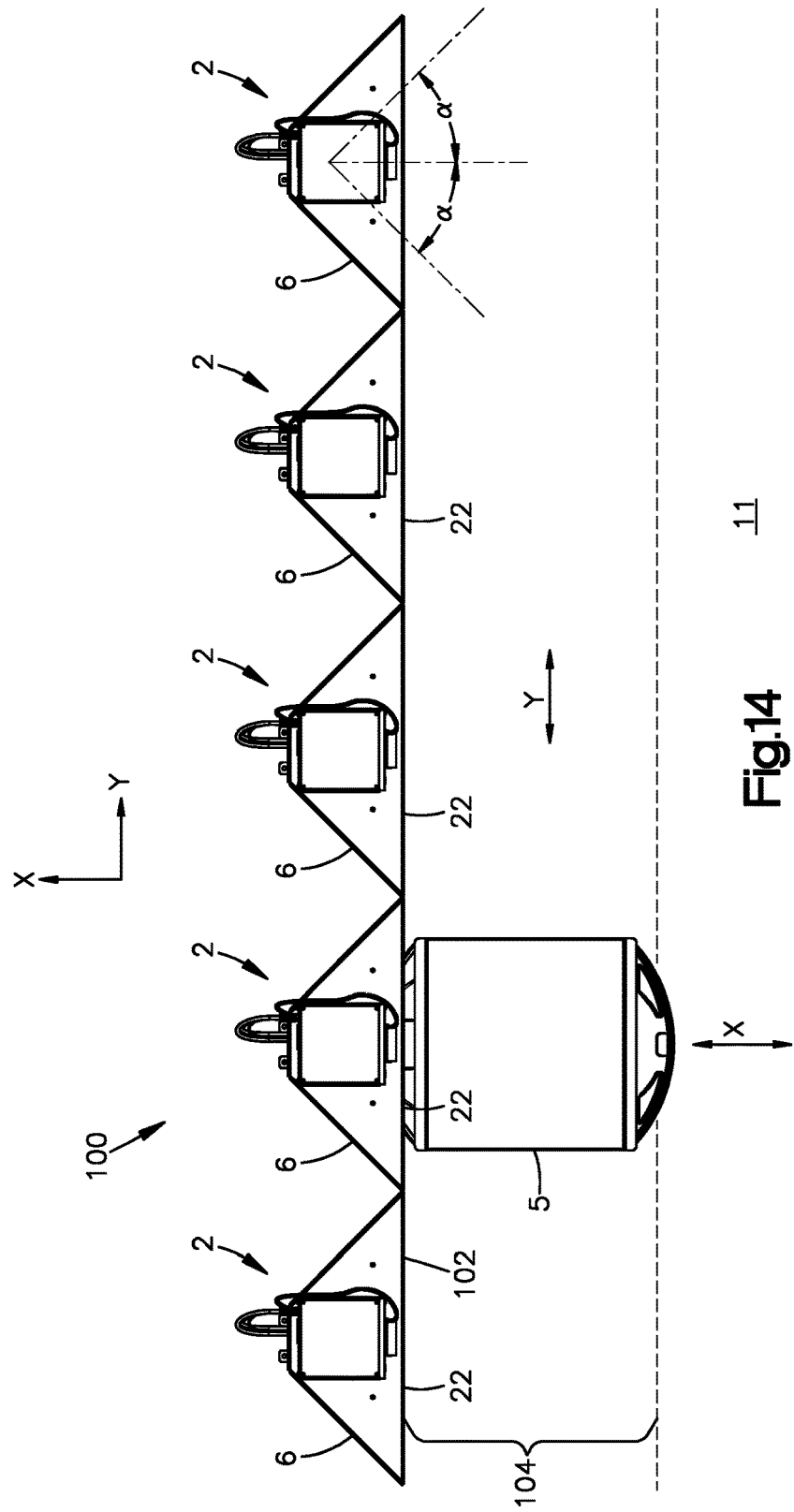
Figure 15:
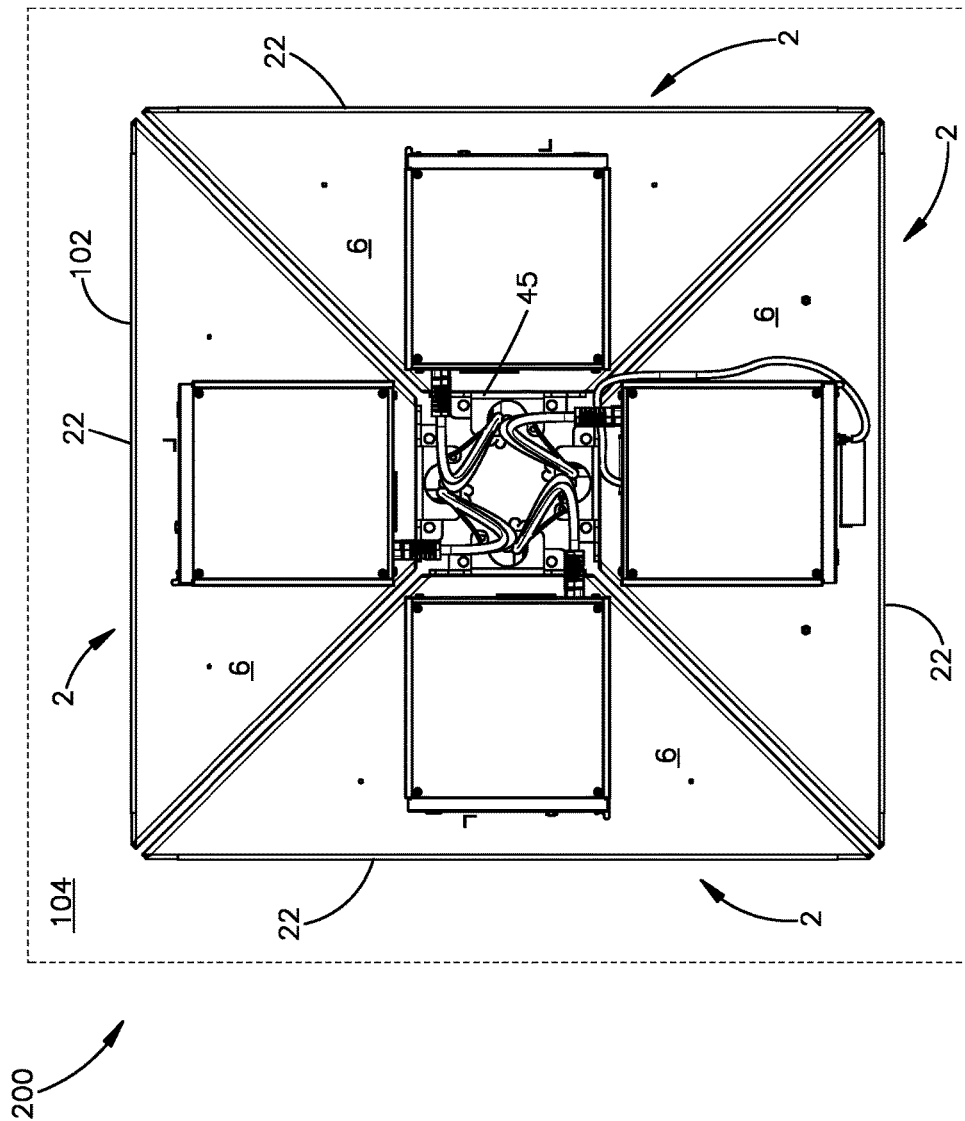

FIG. 12 shows a perspective view of an another spring arrangement for a compliant charge connector, according to another embodiment of the present disclosure;

FIG. 13 shows a perspective view of the charging station of FIG. 1 docked with another mobile drive unit, according to an embodiment of the present disclosure; and FIG. 14 shows a plan view of a system for charging a plurality of mobile drive units, wherein the system employs a plurality of the charging station shown in FIG. 1; and FIG. 15 shows a top perspective view of an arrangement of charging stations, according to an embodiment of the present disclosure.

DETAILED DESCRIPTION

The embodiments disclosed herein pertain to electric charging stations that employ charge connectors (such as a plugs, sockets, cartridges, ports, or the like) that have positional compliance in one or more directions. Such positional compliance allows mobile drive units to approach the station charge connector at an angle and achieve mating connection between the mobile drive unit connector and the station connector. Such positional compliance also allows the charging station to accommodate a wider range of navigational tolerances exhibited by a mobile drive unit, as well as elevation variances in a fulfillment center floor, during mating engagement between the charge connectors. Such positional compliance also reduces overall wear on the station connector and the mobile drive unit connectors, allowing for longer service periods, and thus reducing operational costs and downtime.

Figure 2:
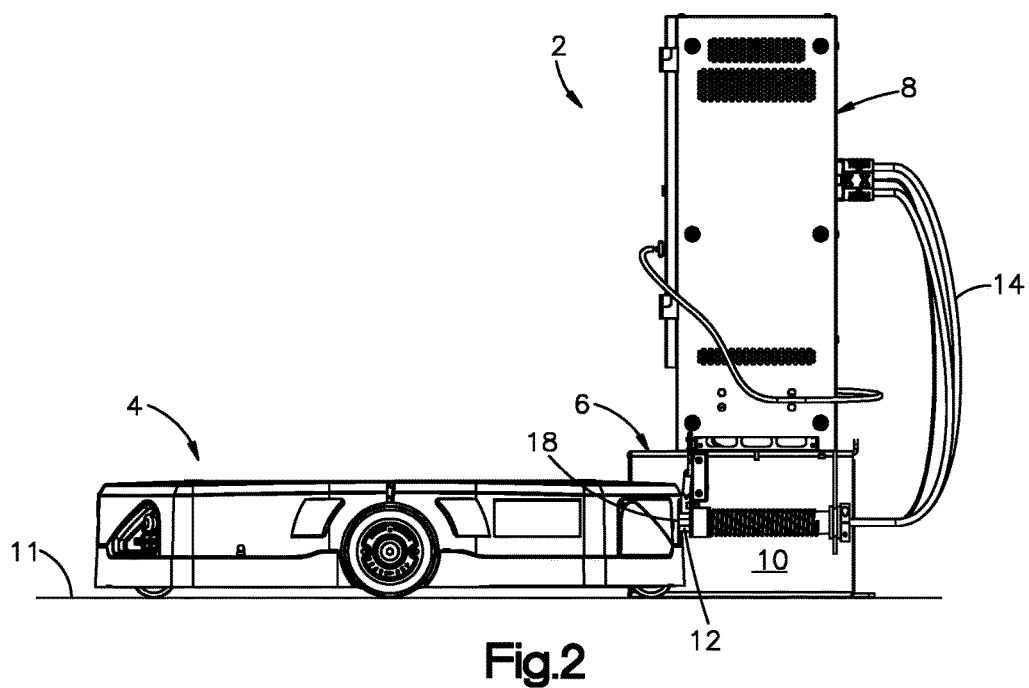
FIG. 2 shows a side plan view of the mobile drive unit docked within the charging station.

Referring now to FIGS. 1 and 2, an electric charging station 2 (also referred to herein as a "charging station") for charging and/or recharging a mobile drive unit 4 includes a frame 6 that is configured to be operatively coupled to an electrical charging unit 8. The frame 6 can carry or otherwise support the electrical charging unit 8. Preferably, the electrical charging unit 8 is supported atop the frame 6. The frame 6 defines an interior volume of space 10 that is configured to receive at least a portion of the mobile drive unit 4, as discussed in more detail below. The electrical charging unit 8 is preferably positioned above the interior volume 10 along a vertical direction Z. The frame 6 is configured to be mounted to a floor 11. The mobile drive units 4 travel on the floor along at least one of, and preferably both of, a longitudinal direction X and a lateral direction Y. In this manner, the mobile drive units 4 can shuttle pods along the floor 11 as desired. The mobile drive units 4, and their operation, are more fully described in U.S. patent application Ser. No. 15/934,507, filed Mar. 23, 2018, in the name of Pajevic, et al., and Ser. No. 15/934,845, filed Mar. 23, 2018, in the name of Pajevic, et al., the entire disclosure of each of which is incorporated herein by this reference.

The vertical direction Z, longitudinal direction X, and lateral direction Y are substantially perpendicular to each other. The longitudinal and lateral directions X, Y can be characterized as "horizontal" directions. As used herein, the terms "longitudinal", "longitudinally", "forward", "rearward", "front", "back", "behind", and their derivatives refer to the longitudinal direction X; the terms "lateral", "laterally", and their derivatives refer to the lateral direction Y; and the terms "vertical", "vertically", and their derivatives refer to the vertical direction Z.

The charging station 2 includes a charge connector 12 located within the interior volume 10 of the frame 6. The charge connector 12 defines a central axis 3 when the connector 12 is in an initial (i.e., "resting") position prior to engagement with a mobile drive unit 4. The charge connector 12 (also referred to herein as a "first" or "station" connector) is in electrical communication with the electrical charging unit 8, such as by one or more electrical cables 14. The station connector 12 is configured to mate with a corresponding charge connector 16 of the mobile drive unit 4, which connector 16 is also referred to herein as a "second" or "mobile" connector. The station connector 12 can include male connector pins configured to electrically couple with female connector pins of the mobile connector 16, or vice versa. The mobile connector 16 can be located on a first or "docking" portion 18 of the mobile drive unit 4, and can be in electrical communication with a battery of the mobile drive unit 4. Thus, when the mobile connector 16 is mated with the station connector 12, as shown in FIG. 2, the electrical charging unit 8 can charge the battery of the mobile drive unit 4. As used herein, the term "battery" means any type of electrically chargeable energy storage source, including chargeable or charged capacitors, by way of a non-limiting example. Preferably, the mobile connector 16 has a guide feature, such as a funnel or funnel-like shape, to as to guide or otherwise facilitate mating or "docking" engagement between the charge connectors 12, 16. As used herein, the terms "dock", "docking", "docked", and their derivatives refer to mating engagement between the station connector 12 and the mobile connector 16 whereby the electrical charging unit 8 can charge the battery of the mobile drive unit 4.

Figure 3:
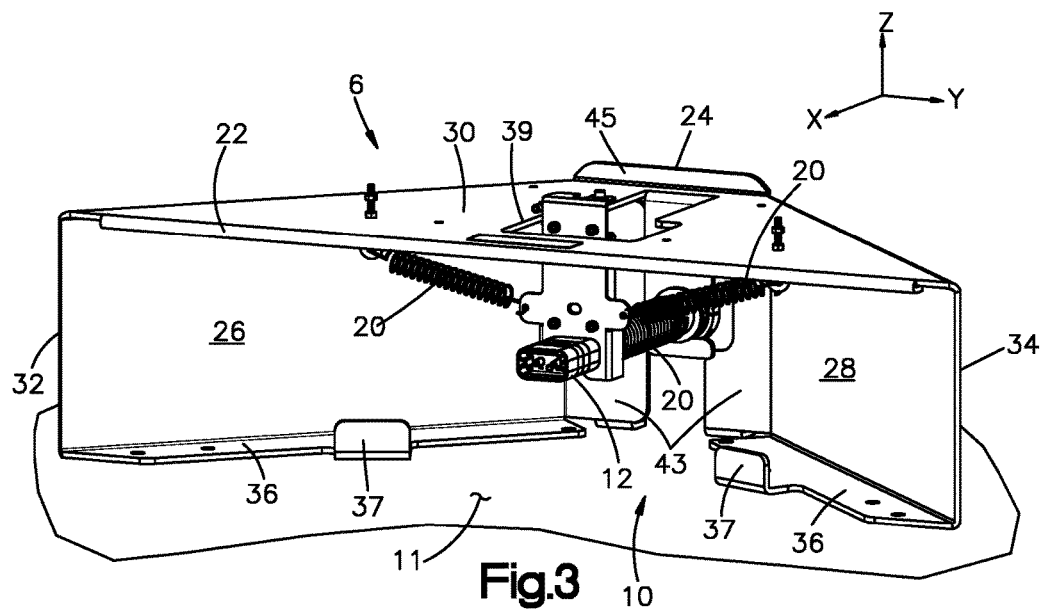
FIG. 3 shows a perspective view of a frame of the charging station of FIGS. 1 and 2.
Figure 4:
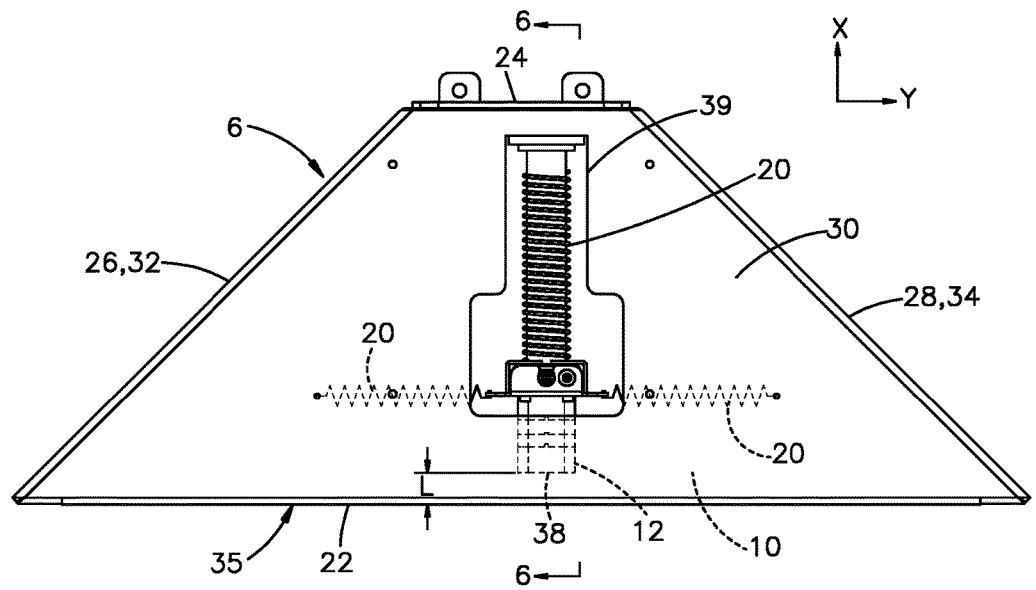
FIG. 4 shows a top plan view of the frame of FIG. 3.

Referring now to FIGS. 3 and 4, the station connector 12 preferably extends forward within the interior volume 10. The station connector 12 is connected to the frame 6 by at least one compliant mechanism 20 that is configured to provide the station connector 12 with positional compliance at least along a lateral direction Y, and preferably also along the vertical and longitudinal directions Z, X, as discussed in more detail below. Such positional compliances can work in concert with the guide feature (such as the funnel or funnel-like shape) of the mobile connector 16 to enhance docking with the mobile drive unit 4. It is to be appreciated that, in some embodiments, the station connector 12 can taper forwardly in a manner generally corresponding to the funnel or funnel-like shape of the mobile connector 16.

The frame 6 defines a front end 22 and a back end 24 spaced from each other along the longitudinal direction X. The frame 6 also defines a pair of opposed sides 26, 28 spaced from each other along the lateral direction Y. The frame 6 can include an upper support member 30 that extends from the front end 22 to the back end 24. In other embodiments, the upper support member 30 can extend between the front and back ends 24 without extending entirely to one or both of the front and back ends 22, 24. The frame 6 includes a pair of side support members 32, 34 that extend downward from the upper support member 30, preferably to the floor 11. The frame 6 can also include one or more rear support members 43 extending downward from the upper support member 30, preferably to the floor 11. The one or more rear support members 43 can define the back end 24 of the frame 6. The frame 6 can also include a rear flange 45. The side support members 32, 34 preferably define the sides 26, 28 of the frame 6. In such embodiments, the side support members 32, 34 can be referred to synonymously with the sides 26, 28, and vice versa.

The side support members 32, 34 can extend substantially to the front end 22 of the frame 6. In some embodiments, the side support members 32, 34 can define the front end 22 of the frame 6. The side support members 32, 34 can also extend substantially to the back end 24 of the frame 6. Each of the side support members 32, 34 and the one or more rear support members 43 is preferably a substantially closed panel, and thus each can be referred to as a "wall." For example, each of the side support members 32, 43 can be referred to as a "side wall" and each of the one or more rear support members 43 can be referred to as a "rear wall." Alternatively, the side support members 42, 44 and the one or more rear support members 43 need not be entirely enclosed. The upper support member 30 and the side support members 32, 34 can collectively define a front opening 35 of the frame 6 at the front end 22 thereof. The mobile drive units 4 thus preferably enter the interior volume 10 through the front opening 35. The upper support member 30 can define a second opening 39, which can provide vertical access to the interior volume 10 from outside the frame 6.

The side support members 32, 34 preferably converge toward one another as they extend from the front end 22 to the back end 24 of the frame 6. Stated differently, the side support members 32, 34 can flare outwardly toward the front end 22. In this manner, the side support members 32, 34 can be oriented at an angle with respect to each other. Thus, the frame 6 can have a triangular or trapezoidal shape in a horizontal reference plane. The angled side support members 32, 34 can allow the docking portion 18 of a mobile drive unit 4 to enter the interior volume 10 at an acute angle with respect to the longitudinal direction X. The frame 6 design can also allow the charging station 2 to occupy less horizontal space than prior art charging stations.

The side support members 32, 34 can be configured to be mounted directly to the floor 11, such as via a pair of floor mounting brackets 36. The interior volume 10 can be defined along the vertical direction Z between the floor 11 and the upper support member 30. The interior volume 10 can be defined along the lateral direction Y between the pair of side support members 32, 34. The interior volume 10 can be defined along the longitudinal direction X between the front and back ends 22, 24. The frame 6 can optionally include one or more abutment features, such as stop tabs 37, configured to abut a mobile drive unit 4 so as to impede its movement within the interior volume 10 as needed, such as to protect the station connector 12 from damaging contact with the mobile drive unit 4, for example. The stop tabs 37 can also be oriented so as to guide, such as by funneling, the docking portion 18 of the mobile drive unit 4 into a fully docked position with respect to the frame 6.

As shown in FIG. 4, the station connector 12 defines a front end 38 that is located rearward of the front end 22 of the frame 6 by an offset distance L measured along the longitudinal direction X. Stated differently, the front end 38 of the station connector 12 is recessed longitudinally within the interior volume 10. In this manner, the frame 10 protects the station connector 12 from inadvertent contact with mobile drive units 4 as they travel proximate the charging station 2. Thus, the charging station 2 described herein can allow the mobile drive units 4 to travel laterally in front of the charging station 2, as described in more detail below.

Positional compliance of the station connector 12 will now be discussed with reference to FIGS. 5 through 7.

Figure 5:
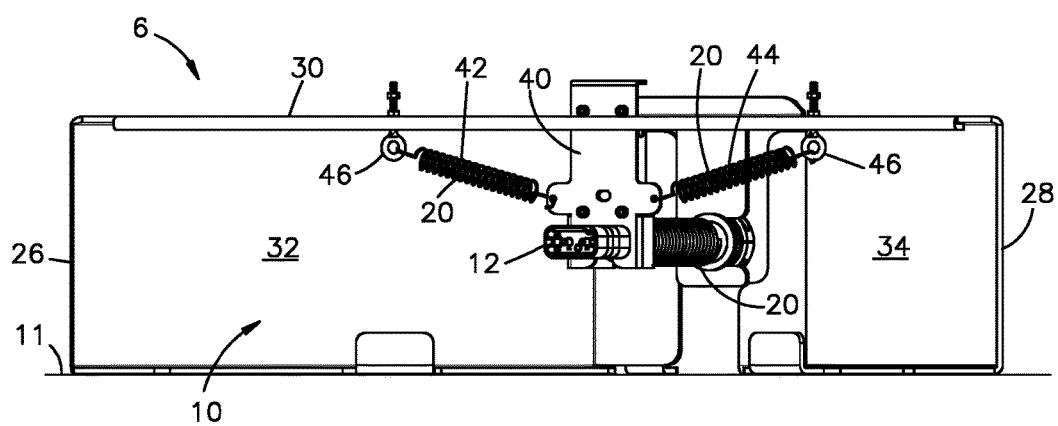
FIG. 5 shows a perspective view of a front opening of the frame of FIG. 3.

Referring now to FIG. 5, the station connector 12 can be attached to a mount 40. The station connector 12 can be characterized as being "supported by" and/or "carried by" the mount 40. The mount 40 at least partially extends below the upper support member 30 and within the interior volume 10. The mount 40 can extend vertically through the second opening 39. In the illustrated embodiment, the mount 40 is connected to the frame 6 by the at least one compliant mechanism 20. The station connector 12 preferably extends forward from the mount 40 to facilitate docking with the mobile connector 16. The mount 40 can optionally also carry one or more electrical components, such as for communicating with the mobile drive units 4, such as for navigation, for example.

The at least one compliant mechanism 20 can include a plurality of compliant mechanisms, such as a plurality of springs. The springs can also be referred to as "biasing members." The plurality of springs can be configured to suspend the station connector 12 in three-dimensional space within the interior volume 10. Thus, the station connector 12 can be characterized as a "floating" connector. The plurality of springs can include a first spring 42 and a second spring 44 extending between the mount 40 and the frame 6 at least partially along the lateral direction Y. For example, the first and second springs 42, 44 can extend from a pair of spring mounts 46 of the frame 6. The spring mounts 46 can be monolithic with the frame 6 or, as shown, can be rigidly affixed to the frame 6, such as at the upper support member 30 thereof. As referenced herein, each spring can be characterized as extending "from" and/or "to" the part of the frame 6 to which the associated spring mounts are attached or from which the associated spring mounts extend. For example, in embodiments where spring mounts 46 are attached to the upper support member 30, the first and second springs 42, 44 can each be characterized as extending "from" and/or "to" the upper support member 30.

The first and second springs 42, 44 can be configured to provide the mount 40, and thus the station connector 12, with positional compliance at least along the lateral direction Y, and optionally also along the vertical and/or longitudinal directions V, X. For example, the first and second springs 42, 44 can each extend between the mount 40 and the frame 6 at least partially along the vertical direction so as to provide the mount 40, and thus the station connector 12, with positional compliance along the vertical direction Z. As shown, the first and second springs 42, 44 can each extend from the frame 6, such as from the upper support member 30, to the mount 40 partially along both of the lateral and vertical direction Y, Z. It is to be appreciated that the charging station 2 design, as disclosed herein, allows the lateral compliance and the vertical compliance of the mount 40, and thus the station connector 12, to be adjusted as needed by varying parameters of one or both of the first and second springs 42, 44, such as the spring compliance (defined as the inverse of the spring rate), length, and orientation, by way of non-limiting examples.

The plurality of springs can further comprise a third spring 48, which further connects the mount 40 to the frame 6. The third spring 48 can be configured to provide the mount 40 with positional compliance at least along the longitudinal direction X. The third spring 48 preferably extends substantially along the longitudinal direction X. The third spring 48 is preferably located rearward of the mount 40. For example, the third spring 48 can be coupled to, and extend longitudinally forward from, a second or "rear" mount 50 that is rigid with the frame 6. In such embodiment, mount 40 can be referred to as a first or "front" mount. The rear mount 50 can be rigidly affixed to the frame 6 or, as shown, can be a flange or tab that is monolithic with the frame 6. The rear mount 50 can extend from the upper support member 30. In the illustrated embodiment, the third spring 48 is a compression spring configured to bias against the rear mount 50 and the front mount 40. The rigidity of the rear mount 50 causes the third spring 48 to bias the front mount 40, and thus the station connector 12, forward, particularly while the station connector 12 docks with the mobile connector 16. In this manner, the third spring 48 can maintain docking engagement between the charge connectors 12, 16, which can enhance the charging efficiency of the charging station 2.

Figure 6:
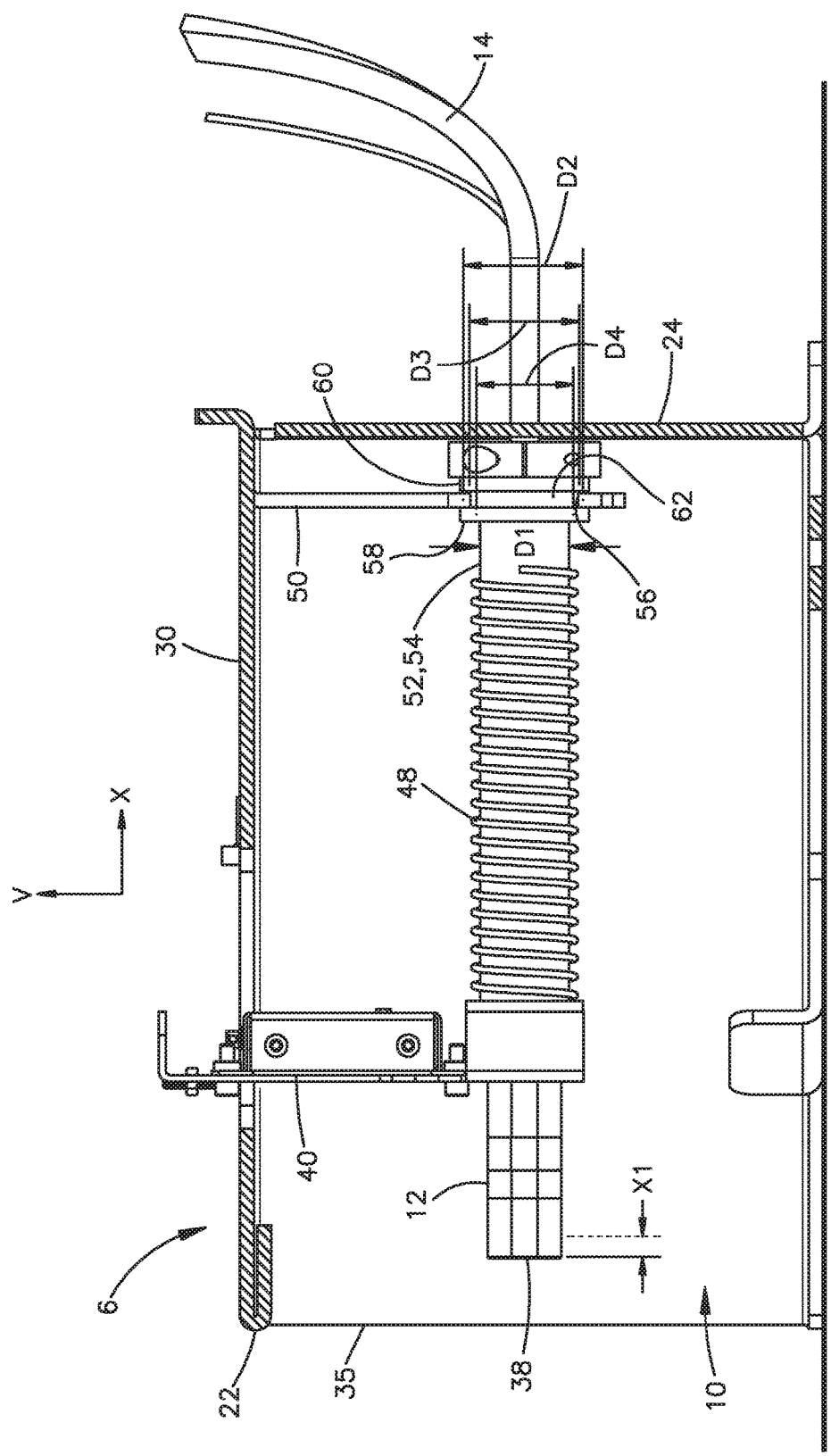
FIG. 6 shows a side sectional view of the frame, taken along section line 6-6 in FIG. 4.

Referring now to FIG. 6, the rear mount 50 can extend downwardly into the interior volume 10 from the upper support member 30. In such embodiments, the third spring 48 can extend forward from the rear mount 50 to the front mount 40. Optionally, the third spring 48 can be longitudinally aligned with the station connector 12. The third spring 48 can surround at least a portion of a support member 52 that is connected to the front and rear mounts 40, 50. The at least a portion of the support member 50 can be a tube 54, which can be referred to as a "support tube." The support tube 54 can be configured to house one or more electrical cables 14 extending from the electrical charging unit 8 to the station connector 12. The support tube 54 can be received within an opening 56 defined in the rear mount 50.

The support tube 54 defines an outer diameter D1, and the opening 56 can define an inner diameter D2 that is greater than the outer diameter D1. The support tube 54 can extend through a bushing 58 that is received in the opening 56. The bushing 58 can act as a rear spring stop for the third spring 48. When compressed, the third spring 48 can be configured to engage the rear spring stop, such as by biasing against the rear spring stop. The bushing 58 can have an outer surface 60 that defines an annular recess 62. The rear mount 50 can be at least partially received in the annular recess 62. The bushing 58 can define an outer diameter D3 measured within the annular recess 62. The inner diameter D2 of the rear mount opening 56 is greater than the outer diameter D3 within the annular recess 62 of the bushing 58. Optionally, inner diameter D2 is greater than the outer diameter D3 by a margin so as to define an at least partially annular gap between the annular recess 62 of the bushing 58 and the rear mount opening 56. In this manner, the connection between the support tube 54 and the rear mount 50 allows the support tube 54 to move within the opening 56 along the longitudinal, lateral, and vertical directions X, Y, Z, thus facilitating positional compliance of the front mount 40 and the station connector 12. In one non-limiting example, inner diameter D2 can be greater than outer diameter D3 by about 1.0 mm or more.

Alternatively, the bushing 58 can fit snuggly in the rear mount opening 56, while an inner surface of the bushing 58 can define an inner diameter D4 that is greater than the outer diameter D1 of the support tube 54 so as to define an annular gap between the support tube 54 and the inner surface of the bushing 58. This annular gap can allow the support tube 54 to move within the bushing 58, and thus within the rear mount opening 56, along the longitudinal, lateral, and vertical directions X, Y, Z, thus facilitating positional compliance of the front mount 40 and the station connector 12. For example, the inner diameter D4 of the bushing 58 can be greater than outer diameter D1 of the support tube 54 by about 1.0 mm or more.

In other embodiments, the bushing 58 can be omitted. In such embodiments, a margin between the outer diameter D1 of the support tube 54 and the inner diameter D2 of the rear mount opening 56 defines an at least partially annular gap between the support tube 54 and the rear mount opening 56. This gap allows the support tube 54 to move within the opening 56 along the longitudinal, lateral, and vertical directions X, Y, Z, thus facilitating positional compliance of the front mount 40 and the station connector 12. For example, inner diameter D2 can be greater than outer diameter D1 by about 4.0 mm or more. In one such non-limiting example, inner diameter D2 can be about 40 mm and outer diameter D1 can be about 38 mm.

Figure 7:
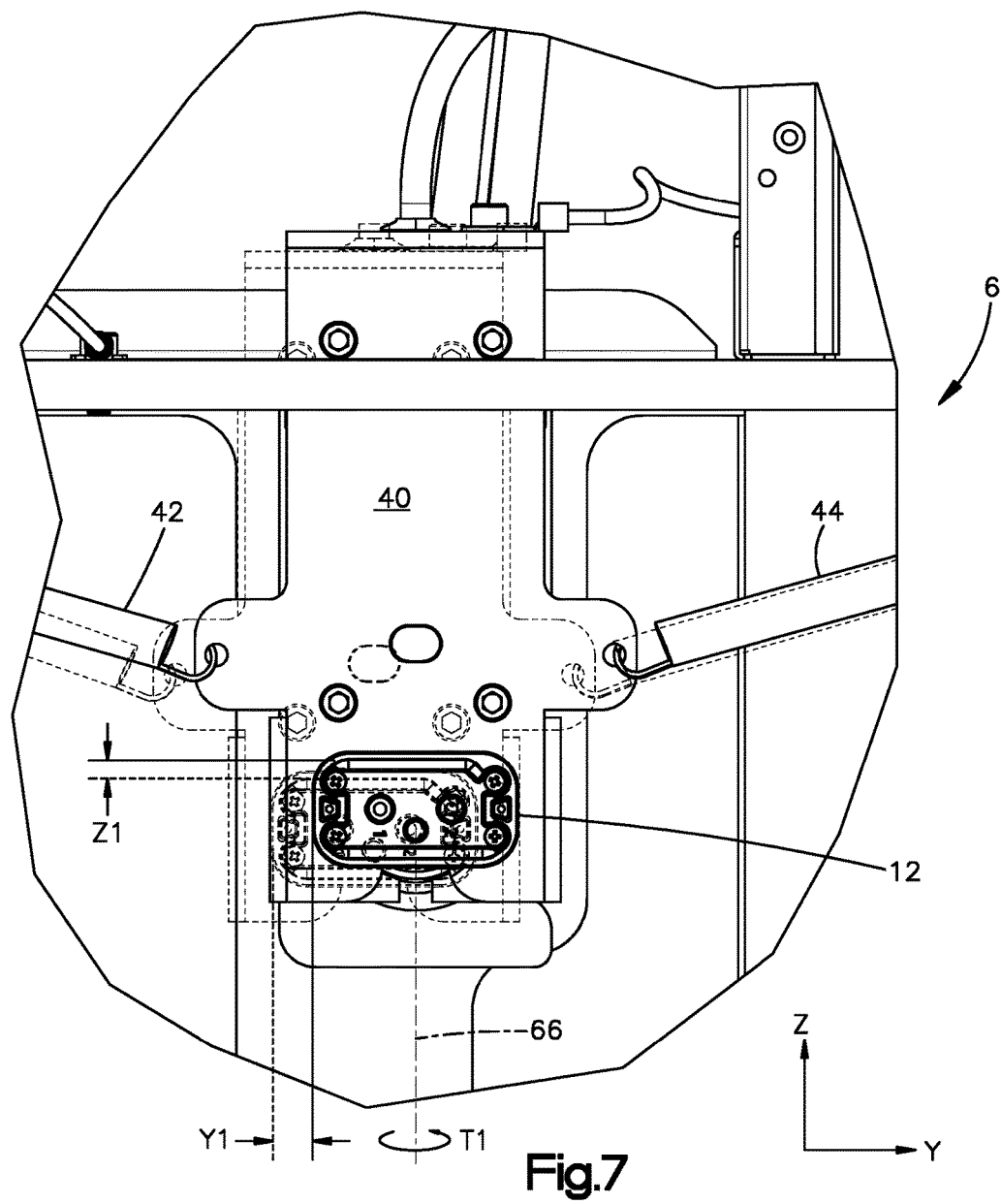
FIG. 7 shows a front view of a compliant charge connector attached to the frame by a plurality of springs, according to an embodiment of the present disclosure.

Referring now to FIG. 7, the charging station 2 is configured to provide the station connector 12 with positional compliance at least along a lateral direction Y, and preferably also along the vertical and longitudinal directions Z, X, as described above. For example, the plurality of springs can be configured to provide the charge connector 12 with a lateral compliance distance Y1 to each side (which can result in a total side-to-side lateral compliance distance equivalent to 2×Y1). The plurality of springs can be configured to provide the charge connector 12 with a vertical compliance distance Z1 each of upward and downward (which can result in a total up-down vertical compliance distance equivalent to 2×Z1). The plurality of springs can be configured to provide the charge connector 12 with a longitudinal compliance distance X1 to each end (which can result in a total front-to-back lateral compliance distance equivalent to 2×X1) (see FIG. 6). The plurality of springs can also be configured to provide the station connector 12 with a rotational compliance T1 in either rotational direction about a central vertical axis 66 defined by the station connector 12 (which can result in a total rotational compliance equivalent to 2×T1). The rotational compliance T1 can accommodate situations in which the docking portion 18 of the mobile drive unit 4 enters the interior volume 10 at an acute angle with respect to the longitudinal direction X.

The lateral, vertical, and horizontal compliance distances Y1, Z1, X1 are each measured from a the initial position of the charge connector 12. By way of non-limiting example, the lateral compliance distance Y1 can be between 1 mm and 100 mm, and preferably at least about 20 mm, and optionally about 30 mm. By way of non-limiting example, the rotational compliance T1 can be between 1 degree and 15 degrees, and preferably at least about 3 degrees, about the central vertical axis 66. By way of non-limiting example, the vertical compliance distance Z1 can be between 1 mm and 50 mm, and preferably at least about 10 mm, and optionally about 20 mm. By way of non-limiting example, the longitudinal compliance distance X1 can be between 1 mm and 100 mm, and preferably at least about 45 mm, and optionally about 60 mm.

It is to be appreciated that each of the foregoing compliances provides enhanced docking between the charging station 2 and the mobile drive units 4, and can compensate for various navigational tolerances of the mobile drive units 4, as well as variations in the floor 11, for example. The positional flexibility of the station connector 12 allows the charging stations 2 disclosed herein to be employed in a wide variety of industrial applications in which automated, semi-automated, or user-controlled mobile units are required to dock with a charging unit.

Figure 8:
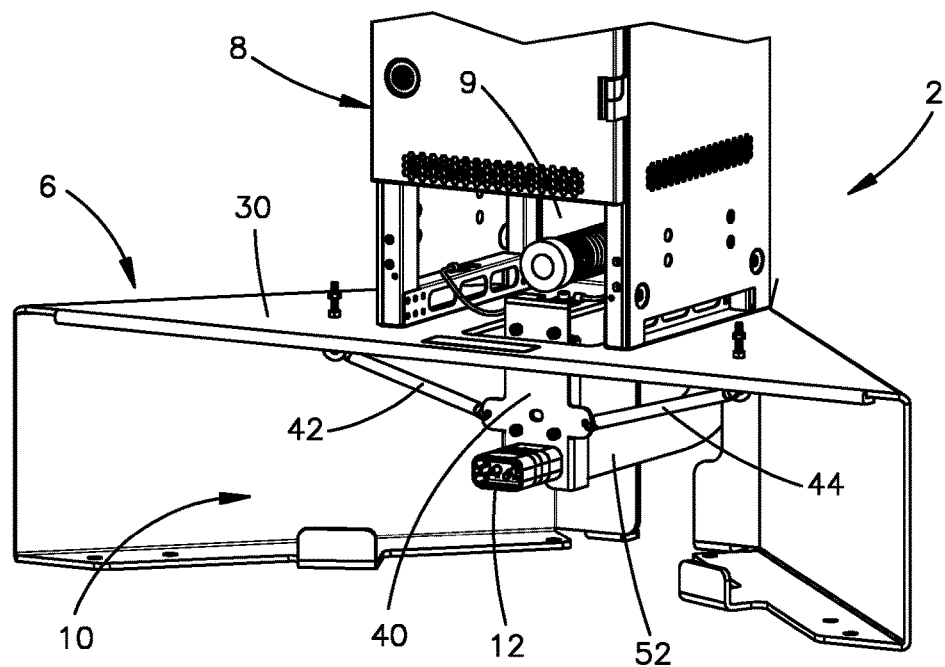
FIG. 8 shows a partial perspective view of a charging station, according to another embodiment of the present disclosure.
Figure 9:
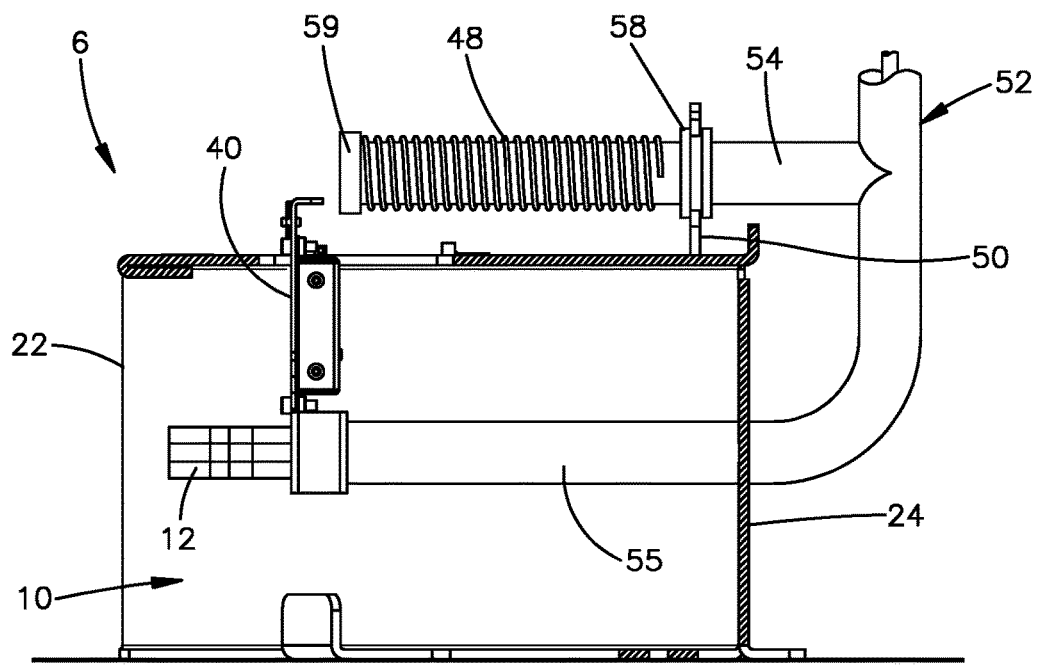
FIG. 9 shows a perspective view of a frame of the charging station of FIG. 8.

Referring now to FIGS. 8 and 9, in other embodiments, support member 52 can extend outside the frame 6 (and thus outside the interior volume 10). For example, the support member 52 can include a first support tube 55 that extends within the interior volume 10, such as from the back end 24 of the frame 6, and is connected to the station connector 12. The first support tube 55 can be configured to house one or more electrical cables extending from the electrical charging unit 8 to the station connector 12. In the present embodiment, support tube 54 can be characterized as a "second" support tube. The second support tube 54 can be rigid with the first support tube 55. For example, the first support tube 55 and the second support tube 54 can be monolithic with each other. In such embodiments, support member 52 can be characterized as a manifold that includes the first support tube 55 and the second support tube 54. Alternatively, the first support tube 55 and the second support tube 54 can be separate tubes that are rigidly affixed to each other.

The second support tube 54, as well as the rear mount 50 and its opening 56, can be located above the upper support member 30 of the frame 6. In particular, the rear mount 50 can extend upwardly from the upper support member 30. As shown in FIG. 8, the second support tube 54 and the rear mount 50 can be located in a housing space 9 defined by the electrical charging unit 8. The second support tube 54 can be coupled to the rear mount 50 via the bushing 58. The bushing 58 and the rear mount opening 56 can be configured generally similar to manner in which they are respectively described above with reference to FIG. 6. For example, an annular gap can be defined between the outer diameter D1 of the second tube 54 and the inner diameter of the bushing 58, so as to allow the second support tube 54 to move within the opening 56 along one or more of the longitudinal, lateral, and vertical directions X, Y, Z. The third spring 48 can be received over the second support tube 54 and can be a compression spring, as described above. The third spring 48 can extend between a rear spring stop defined by the bushing 58 and a front spring stop 59 affixed to the second support tube 54 forwardly of the bushing 58. The third spring 48 can be configured to provide the station connector 12 with positional compliance along the longitudinal direction X. For example, the third spring 48 can be configured to compress between the bushing 58 and the front spring stop 59 so as to bias the front spring stop 59, and thus the first support tube 55 and the station connector 12, forward, particularly while docking with a mobile drive unit 4.

Figure 10:
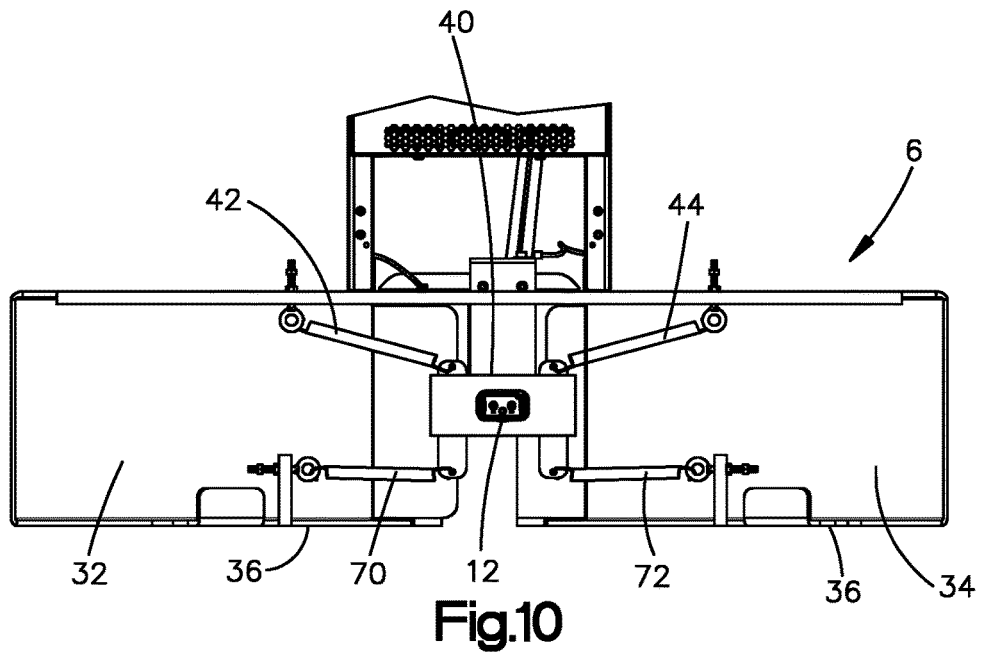
FIG. 10 shows a front view of a spring arrangement for a compliant charge connector, according to another embodiment of the present disclosure.

It is also to be appreciated that the plurality of springs can be employed in other arrangements. For example, as shown in FIG. 10, the plurality of springs can include the first and second springs 42, 44 generally arranged as described above, and can also include a fourth spring 70 and a fifth spring 72 extending from the station connector 12 (such as from a front mount 40 configured similarly as described above) to the floor mounting brackets 36 or to the side support members 32, 34. The third and fourth springs 70, 72 can be arranged so that each extends laterally and vertically. In the present embodiment, springs 42, 44, 70, 72 can generally be arranged in an "X" pattern.

Figure 11:
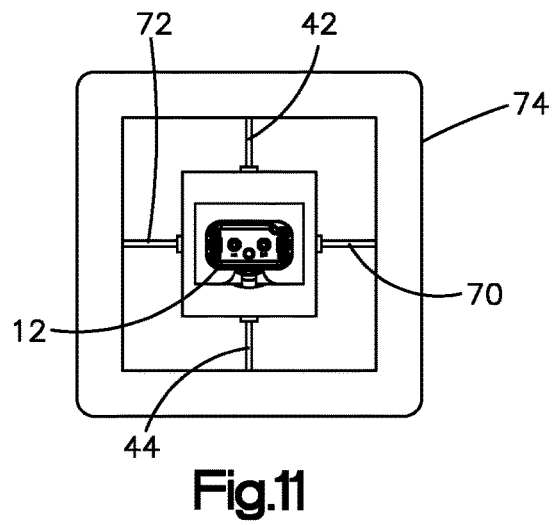
FIG. 11 shows a front view of another spring arrangement for a compliant charge connector, according to another embodiment of the present disclosure.

Referring now to FIG. 11, springs 42, 44, 70, 72 can alternatively be arranged generally in a "cross" pattern. For example, the first and second springs 42, 44 can extend vertically and the fourth and fifth springs 70, 72 can extend laterally. Additionally the springs 42, 44, 70, 72 can suspend the station connector 12 within a carriage 74 that can be affixed to the frame 6 as needed.

Referring now to FIG. 12, in other embodiments, the at least one compliant mechanism 20 can comprise a single compliant mechanism, such as a bellows-type spring member 76, also referred to herein as a "bellows spring." The bellows spring 76 can be coupled to the station connector 12 and can also be coupled to a support member 78 that can be configured to attach to the frame 6 as necessary. The bellows spring 76 can be configured to provide the station connector 12 with positional compliance along one or more (or each of) the lateral direction Y, the vertical direction Z, and the longitudinal direction X.

Referring now to FIG. 13, the charging station 2 disclosed herein can also be used with other types of mobile drive units 5. The mobile drive unit 5 shown in FIG. 13 can have a drive portion 7a that is configured generally similarly to the mobile drive unit 4 described above. In addition, mobile drive unit 5 can have an upper portion 7b that carries a mobile conveyor 9. The upper portion 7a can be rotationally connected to a turntable of the drive portion 7a, which turntable defines a vertical axis of rotation 13. The turntable can rotate the upper portion 7 about axis 13 as needed. In one example embodiment, mobile drive unit 5 can be configured to carry on its mobile conveyor 9 one or more items that have already been sorted and packaged. Mobile drive unit 5 can shuttle the packaged items to various staging locations within the fulfillment center according to the zip codes to which the items will be shipped. At such staging locations, for example, the floor can define openings or holes that lead to chutes that feed packages deposited through the holes into containers, such as gaylords, for example, that can be loaded onto a delivery vehicle designated to ship the items to the associated zip code. Upon reaching a staging location in the fulfillment center, the mobile drive unit 5 can be configured to actuate the turntable and conveyor 9 as needed to deposit the packages thereon through the hole. The charging station 2 can be configured to dock with mobile drive unit 5 without contacting the upper portion 7a. Additionally, the charging station 2 can allow the mobile drive unit 5 to dock while the upper portion 7b is laden with items, which can vastly increase the overall efficiency of any sortation system employing mobile drive units.

Referring now to FIG. 14, a system 100 for charging a plurality of mobile drive units 5 can include a plurality of the electric charging stations 2 described above. The charging stations 2 can be disposed on a floor 11. The charging stations 2 can be aligned with each other along a direction. For example, the charging stations 2 can arranged such that front ends 22 of each of the frames 6 are aligned along the lateral direction Y, which direction is oriented as described above with reference to the frame 6. The front ends 22 of the charging stations 2 can collectively define a boundary 102 of a zone of travel 104, such as a lane, for the mobile drive units 5 direction in front of the charging stations 2. The mobile drive units 5 can travel through the lane 104 to dock with a respective charging station 2 along the longitudinal direction X or at an acute angle α with respect to the longitudinal direction X. Because the station charge connectors 12 are recessed within the frames 6, and thus remote from the lane of travel 104, the mobile drive units 5 can also travel along the lane 104 along the lateral direction Y substantially without risk of impacting or otherwise damaging the station charge connectors 12. In this manner, the charging stations 2 disclosed herein can provide the advantage of providing the mobile drive units 5 with more lateral travel space in front of the stations 2. It is to be appreciated that although system 100 is shown with a mobile drive unit 5 as described in reference to FIG. 13, the system can also work with mobile drive units 4 described above.

Referring now to FIG. 15, a system 200 for charging a plurality of mobile drive units 4, 5 can include a plurality of charging stations 2 arranged in a central hub 205. For example, the rear ends 24 of the frames 6 can face inwards with the front ends 22 of the frames facing outwards. The frames 6 can be arrayed in a radial pattern. As shown, the side walls 32, 34 of each frame 6 can be oriented at a ninety degree angle with respect to each other. In this manner, the front ends 22 of the frames 6 can define a rectangular (e.g., square) boundary 102 of a zone of travel 104 for the mobile drive units 4, 5. Because the station charge connectors 12 are recessed within the frames 6, and thus remote from the zone of travel 104, the mobile drive units 4, 5 can also travel in the zone 104 along the longitudinal and lateral direction X, Y substantially without risk of impacting or otherwise damaging the station charge connectors 12. The hub 205 design of the present embodiment can allow for an enhanced utilization of floor space for the charging system 200. Also, In the present embodiment, the rear flanges 45 can extend upward from the upper support member 30 to a greater height than in the other depicted embodiments, and can include a horizontal tab with an opening for retaining one or more cables 14 extending from the electrical charging unit 8.

It is to be appreciated that in embodiments where the side support members 32, 34 and the one or more rear support members 43 of the frame and substantially closed walls, the walls provide the benefit of inhibiting interference between wireless electronic communications employed by the stations 2 and the mobile drive units 4, 5. For example, the station connectors 12 can employ wireless electronic communications, such as one or more transmitters (such as infrared and/or laser transmitters) and one or more receivers that communicate information, such as navigation data (i.e., data that can be interpreted to assist with navigation of the mobile drive units 4, 5), with one or more transmitters and one or more receivers on the mobile drive units 4, 5. The walls 32, 34, 43 of the frames 6 are preferably configured to prevent, or at least substantially reduce, interference of the transmissions between one or more of the mobile drive units 4, 5 and one or more of the stations 2 that could otherwise confuse navigation of the mobile drive units 4, 5.

It should be noted that the illustrations and descriptions of the embodiments shown in the figures are for exemplary purposes only, and should not be construed limiting the disclosure. One skilled in the art will appreciate that the present disclosure contemplates various embodiments. Additionally, it should be understood that the concepts described above in connection with the respective above-described embodiments may be employed alone or in combination with any of the other embodiments described above. It should further be appreciated that the various alternative embodiments described above with respect to one illustrated embodiment can apply to all embodiments as described herein, unless otherwise indicated. Also, the present invention is not intended to be limited by any description of drawbacks or problems with any prior art device.

Unless explicitly stated otherwise, each numerical value and range should be interpreted as being approximate as if the word "about" or "approximately" preceded the value or range.

It should be understood that the steps of exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

What is claimed is:

1. A system for charging a plurality of mobile drive units, comprising:
 a plurality of electric charging stations disposed on a floor,
  at least some of the plurality of electric charging stations each comprising:
  a frame, comprising:

an upper support member carrying an electrical charging unit; and a pair of side supports extending from a front end of the frame toward a back end of the frame and extending from the upper support member to the floor, wherein the front end of the frame defines a front end of the associated charging station; and a station charge connector in electrical communication with the electrical charging unit and configured to mate with corresponding charge connectors of the mobile drive units, the station charge connector located below the upper support member and between the pair of side supports, the station charge connector extending along a longitudinal direction, the station charge connector suspended from the associated frame by a plurality of springs, comprising:

a first spring and a second spring each extending from the frame at least partially along a lateral direction that is substantially perpendicular to the longitudinal direction, wherein the first and second springs are configured to provide the station charge connector with positional compliance along the lateral direction; and a third spring located rearward of the first and second springs, the third spring extending at least partially along the longitudinal direction, wherein the spring is configured to provide the station charge connector with positional compliance along the longitudinal direction, wherein the front ends of the electric charging stations collectively define a boundary of a zone of travel for the mobile drive units.

2. The system of claim 1, wherein a front end of each station charge connector is recessed from the front end of the associated frame, wherein the station charge connectors are remote from the zone of travel.

3. The system of claim 1, wherein the first and second springs each extend at least partially along a vertical direction substantially perpendicular to the longitudinal and lateral directions, and the first and second springs are further configured to provide the respective station charge connector with positional compliance along the vertical direction.

4. The system of claim 1, wherein the third spring is aligned with the station charge connector along the longitudinal direction, and extends between the station charge connector and a mount extending below the upper support member.

5. The system of claim 1, wherein the station charge connector is located underneath the electrical charging unit.

6. An electric charging station for a mobile drive unit, comprising:

a frame defining an interior volume of space, the frame configured to carry an electrical charging unit positioned above the interior volume of space along a vertical direction; and a station charge connector configured to be in electrical communication with the electrical charging unit, the station charge connector further configured for mating with a corresponding charge connector of the mobile drive unit, the station charge connector extending forward within the interior volume of space along a longitudinal direction that is substantially perpendicular to the vertical direction, wherein the station charge connector is connected to the frame by at least one compliant mechanism that is configured to provide the station charge connector with positional compliance with respect to the frame, wherein the station charge connector is carried by a mount that at least partially extends within the interior volume of space, the mount is connected to the frame by the at least one complaint mechanism, and the station charge connector extends forward from the mount, and wherein the at least one compliant mechanism comprises a plurality of springs that includes a first spring and a second spring extending between the mount and the frame at least partially along a lateral direction that is substantially perpendicular to the longitudinal direction and the vertical direction, and the first and second springs are configured to provide the mount with positional compliance along the lateral direction.

7. The electric charging station of claim 6, wherein the first spring and the second spring extend between the mount and the frame at least partially along the vertical direction, wherein the first and second springs are configured to provide the mount with positional compliance along the vertical direction.

8. The electric charging station of claim 6, wherein the at least one compliant mechanism comprises a spring connected to the station charge connector and the frame, wherein the spring is configured to provide the station charge connector with positional compliance along the longitudinal direction.

9. The electric charging station of claim 8, wherein the spring is located rearward of the station charge connector and extends along the longitudinal direction.

10. The electric charging station of claim 9, wherein the spring is a compression spring configured to bias the station charge connector forward responsive to engagement with the charge connector of the mobile drive unit.

11. The electric charging station of claim 10, wherein the spring surrounds at least a portion of a support member connecting the station charge connector to a second mount located rearward of the station charge connector, and the second mount is rigid with the frame.

12. The electric charging station of claim 11, wherein the at least a portion of the support member is a support tube.

13. The electric charging station of claim 12, wherein the second mount defines an opening, and the support tube is received in the opening.

14. The electric charging station of claim 13, further comprising a bushing received in the opening, the support tube extending within the bushing, wherein the support tube defines an outer diameter, the bushing defines an inner diameter that is greater than the outer diameter, and the support tube can move within the opening along the lateral and vertical directions.

15. The electric charging station of claim 14, wherein the support tube at least partially extends within the interior volume of space and is aligned with the station charge connector along the longitudinal direction, and the support tube is configured to house one or more electrical cables in communication with the station charge connector.

16. The electric charging station of claim 6, wherein the frame comprises an upper support member and a pair of side support members extending downward from the upper support member, wherein the pair of side support members are configured to be mounted to a floor such that the interior volume of space is defined 1) along the vertical direction between the floor and the upper support member, and 2) along the lateral direction between the pair of side support members.

17. The electric charging station of claim 16, wherein the pair of side support members define a front end of the frame, and the station charge connector defines a front end that is located behind the front end of the frame along the longitudinal direction.

18. The electric charging station of claim of claim 17, wherein the frame defines a back end, and the pair of side support memebers converge toward one another from the front end of the frame to the back end.

* * * * *